United States Patent [19]

Lowe et al.

[11] Patent Number: 5,673,018
[45] Date of Patent: Sep. 30, 1997

[54] TRANSPONDER SYSTEM FOR REPORTING THE DISTANCE TRAVELED BY A WHEELED VEHICLE

[75] Inventors: Peter R. Lowe, Colorado Springs, Colo.; Donald G. Small, San Juan Capistrano, Calif.

[73] Assignee: Palomar Technologies Corporation, Carlsbad, Calif.

[21] Appl. No.: 482,333

[22] Filed: Jun. 7, 1995

[51] Int. Cl.$^6$ .................................................. G08B 21/00
[52] U.S. Cl. .................... 340/445; 340/441; 340/466; 340/870.54; 455/41; 364/467; 235/384
[58] Field of Search ...................................... 340/441, 445, 340/466, 870.3, 870.31, 870.54, 447, 448; 455/41; 364/467; 235/384, 382, 382.5

[56] References Cited

U.S. PATENT DOCUMENTS

| | | | |
|---|---|---|---|
| 3,895,347 | 7/1975 | Takusagawa et al. | 340/447 |
| 4,312,001 | 1/1982 | Marzolf | 340/448 |
| 4,697,278 | 9/1987 | Fleisher | 364/467 |
| 4,730,188 | 3/1988 | Milheiser | |

*Primary Examiner*—Jeffery Hofsass
*Assistant Examiner*—Edward Lefkowitz
*Attorney, Agent, or Firm*—Rodney F. Brown

[57] ABSTRACT

An RF transponder transmits information on the distance traveled by a wheeled vehicle in response to an interrogation signal from an exciter/receiver. A rotation sensor, preferably an odometer/shaft encoder combination that is mounted on a vehicle wheel, provides to the transponder a signal which indicates the distance traveled by the vehicle; the transponder is also preferably mounted to the wheel's rotational hub. The transponder preferably includes a memory with a reprogrammable portion that stores the sensor information, and a non-reprogrammable portion that stores an identification code, all of which is read out in response to an interrogation signal. Driving distances can be obtained automatically without having to read the vehicle's dash board odometer.

21 Claims, 3 Drawing Sheets

TRANSPONDER SYSTEM FOR REPORTING THE DISTANCE TRAVELED BY A WHEELED VEHICLE

BACKGROUND OF THE INVENTION

1. Field of the Invention

This invention relates to systems for reporting the distance a vehicle has been driven, and more particularly to a passive wheel-mounted transponder system that senses the wheel's rotational history and transmits a corresponding RF signal in response to an interrogation signal.

2. Description of the Related Art

For applications such as vehicle maintenance programs and particularly for check-in procedures used in the automobile rental industry, the distances which vehicles have been driven must be determined and matched up with the correct vehicles. This is accomplished at present by manually reading the car's odometer and either noting the car's identification manually, or scanning a bar code displayed on an exterior surface of the car to identify the vehicle. In either case an appreciable amount of time is required, and errors are commonly made in reading the odometer.

One technology that has been used to identify an object, or at least indicate its presence, is radio frequency (RF) transponders. A transponder is commonly used to identify or note the presence of an object to which the transponder is attached. Transponder systems typically employ an exciter/receiver that transmits an RF excitation (interrogation) signal, and a transponder that is energized by the excitation signal to transmit back an identification code. The transponders generally use a single antenna coil to both receive an excitation signal and to transmit back an identification signal; a system of this type is described in U.S. Pat. No. 4,730,188 to Milheiser. Other transponders use separate receiver and transmit antennae.

The general type of transponder circuitry used in systems such as the Milheiser patent is illustrated in FIG. 1. A parallel-resonant antenna coil circuit, consisting of a coil 2 in parallel with a capacitor 4 (in some cases the parasitic capacitance of coil 2 may provide the capacitance required for resonation without the use of a separate capacitor), receives an interrogation signal from an exciter/receiver (not shown) and provides an input to a rectifier 6 and a shunt regulator circuit 8. Although illustrated as a single diode, the rectifier 6 is preferably a full-wave bridge rectifier. In combination with the regulator circuit, it provides positive ($V_{DD}$) and negative, or positive and ground, supply levels for the remainder of the transponder circuitry. A capacitor 9 at the rectifier output reduces ripple.

A clock 10, typically operating at a clock rate of 125 KHz, causes a counter 12 to count up at the clock rate. The counter output is connected to a decoder circuit 14, which includes the serial address logic for a memory 16, typically a serial EEPROM. The memory stores an identification code for the transponder and outputs the digital code to one input of an exclusive NOR gate 18 when the counter 12 has reached a predetermined count. The data output from the memory is typically encoded into a Manchester format. A synch character different in format from the encoded identification data is inserted at the beginning of the frame, and the composite signal is then encoded in a frequency shift key (FSK) format before being applied to the gate 18. The FSK identification code is applied to the antenna coil 2 via a field effect transistor (FET)/resistor circuit 20 connected in parallel with the antenna. The transmission from antenna 2 is detected by the exciter/receiver to provide a response to the interrogation signal. The identification code can be programmed into the memory 16 either by physical contact or, with more recent transponders, by an RF transmission.

The counter 12 provides an output to another counter 22 which is used to drive the message control logic 24. The message control logic provides a frame for the message stream such that a Manchester code violation occurs for the first four bits of the message. This code violation is interpreted by the reader as the beginning of a frame. The messages are produced continuously as long as the tag is energized with the outputs from memory 16 and message control logic 24 gated through an exclusive NOR gate 18.

While the described transponder has been found to be very useful in transmitting a static identification code from a remote location that does not have a local power supply and is not readily accessible by wire, it is incapable of providing information on the distance a vehicle has been driven.

SUMMARY OF THE INVENTION

The present invention seeks to provide a system for rapidly and accurately determining the distance a vehicle has been driven, without having to manually read an odometer.

This goal is achieved by mounting both a rotation sensor and a transponder on the wheel of a vehicle whose driving distance is to be determined. The sensor preferably consists of an odometer/shaft encoder combination that is mounted to and rotates with the wheel, with the transponder including an antenna coil that is also mounted to and rotates with the wheel in at least partial alignment with the openings in a hubcap.

In a preferred embodiment the transponder includes a memory that receives a digital signal from the odometer/shaft encoder as a memory input, and a transponder circuit that is energized in response to an interrogation signal from an exciter/receiver to transmit a transponder signal that includes the wheel rotation information in the memory.

These and other features and advantages of the invention will be apparent to those skilled in the art from the following detailed description, taken together with the accompanying drawings.

DETAILED DESCRIPTION OF THE INVENTION

The invention uses a rotation sensor to sense the rotation of a wheel on a vehicle whose driving distance is to be determined, and a transponder that accumulates a history of the wheel's rotations and, in response to an interrogation signal from an exciter/receiver, transmits a signal that contains this information. Given a known tire diameter, the distance which the vehicle has traveled can be determined from the transmitted information. Both the rotation sensor and the transponder are preferably mounted directly on the wheel, inside a hubcap.

Figure 2:
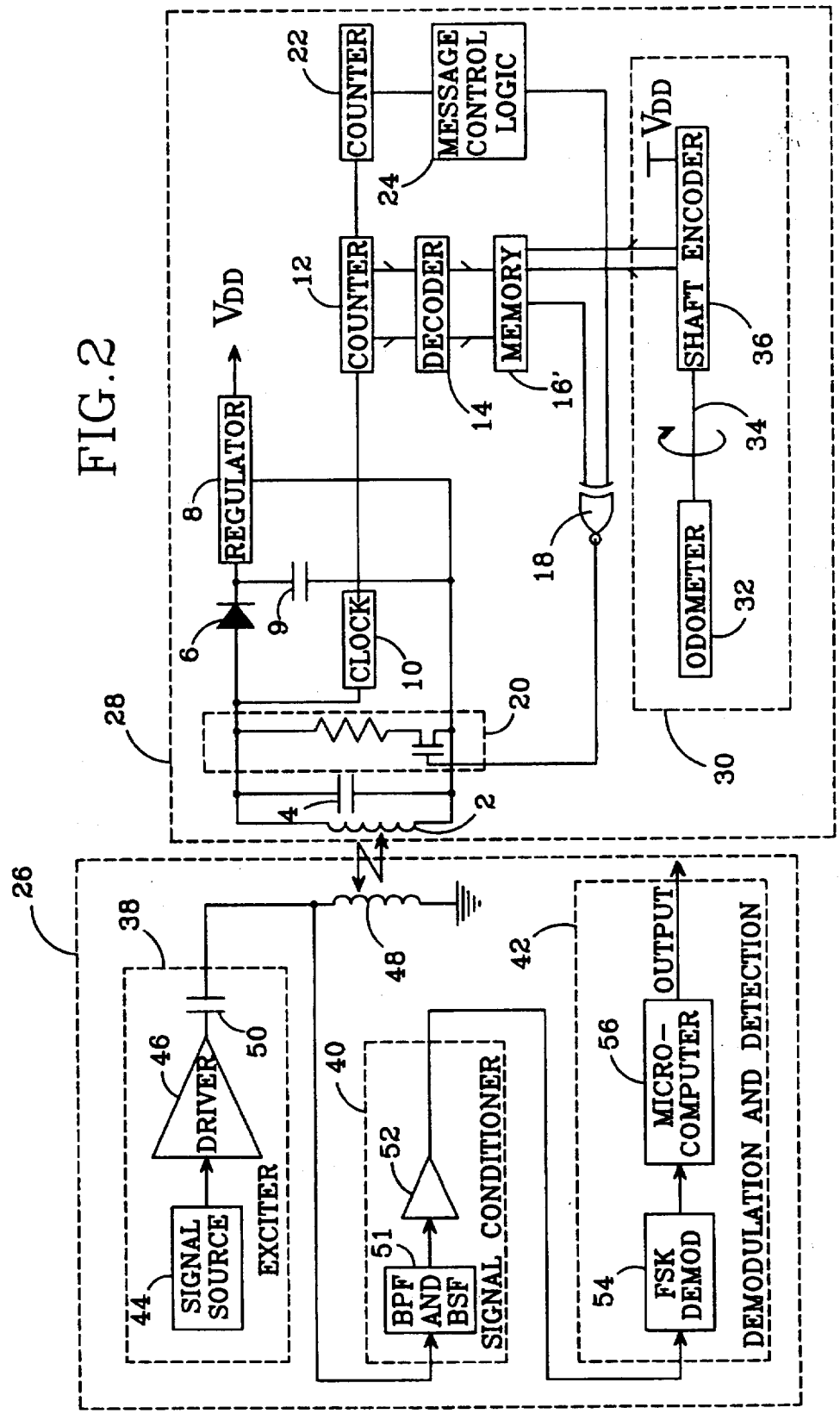
FIG. 2 is a partially block and partially schematic diagram of a transponder system in accordance with the invention, including both a transponder and an exciter/receiver.

FIG. 2 shows a preferred embodiment for the overall transponder system, which includes an exciter/receiver 26 and a transponder 28. The exciter/receiver, which may be either hand held or permanently mounted such as at the vehicle return entrance to a car rental agency, and a transponder 28. When permanently mounted, the exciter/receiver 26 can be automatically actuated by a vehicle detector to transmit an interrogation signal, or it can transmit an interrogation signal continuously. The exciter/receiver does not have to be perfectly aligned with the transponder to complete a communication link between the two; it is sufficient if they are in the same general vicinity, so long as the RF transmission path is not closed off by a body of material that does not propagate an RF signal.

The exciter/receiver transmits an RF interrogation signal that is received by the transponder and used to actuate the transmission of a responsive transponder signal that includes information on the rotational history of the wheel to which the transponder is mounted. The response signal is received and decoded by the exciter/receiver, which thus functions as a transceiver. Although it preferably uses a single antenna for both transmission and reception, these transceiver functions can be separated and even provided at different locations if desired.

Figure 1:
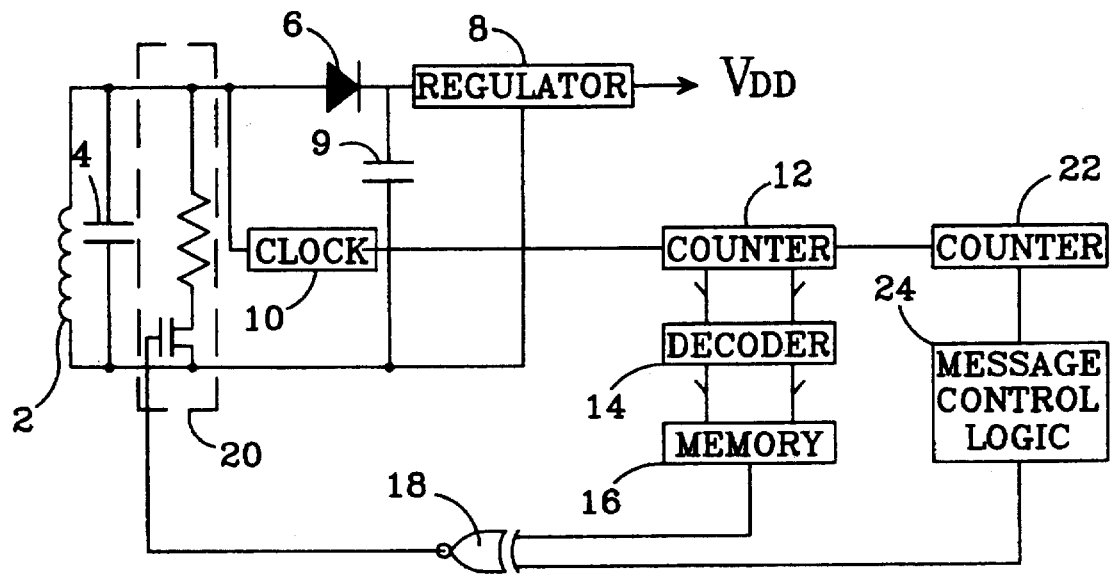
FIG. 1 is a partially block and partially schematic diagram of a prior transponder, described above.

The transponder 28 builds upon the prior transponder illustrated in FIG. 1, and common elements are identified by the same reference numbers. A wheel rotation sensor 30 is provided in association with the transponder, and transmits a signal to the transponder that indicates the wheel's rotations. Although the sensor 30 is indicated as being included within the transponder 28, it will generally be physically separate from the substrate used for the transponder circuitry.

The rotation sensor is preferably implemented with an odometer 32 that causes an output shaft 34 to rotate (relative to the odometer which is itself rotating with the wheel to which it is mounted), and a shaft encoder 36 that addresses a modified memory 16' in the transponder circuitry. Axle mounted odometers are well know, and are commonly used on trucks and buses. Shaft encoders which provide a digital output signal encoding the number of rotations experienced by an input shaft are also well known, and are available for example from Sumtak Electronic Instruments Division of Daido Corp. of Somerset, N.J., Teledyne Gurley Corp. of Troy, N.Y., Lucas Ledex of Vandalia, Ohio and Hohner Shaft Encoder Corp. of Beamsville, Ontario, Canada.

The transponder memory is modified from that shown in FIG. 1 so that it includes a reprogrammable portion that receives and stores the sensor signal from sensor 30 as an indication of the number of wheel rotations. This reprogrammable memory section can be either volatile, in which data must be constantly reapplied or refreshed and in which data are erased when power is no longer applied, or static, which does not need to be refreshed but which loses its data when power is no longer applied. In either case the power supplied in response to an interrogation system is enough for the memory to hold the sensor information while the transponder response signal is being transmitted. The reprogrammable memory section contrasts with the portion of the memory devoted to the transponder's identification code, which once programmed retains the identification code regardless of the termination of supply power. The modified memory is indicated by reference number 16' in FIG. 2.

In response to an actuation by counter 12, the wheel rotation data stored in the memory 16' is read out along with any identification code stored in the memory. The readout can be encoded in various ways, preferably FSK, and transmitted as a transponder signal in the same way as with prior transponders.

Various available exciter/receivers can be used, depending upon the desired operating range and frequency. A suitable exciter/receiver for short range applications is the MINIPROX® reader by Hughes Identification Devices, Inc. This particular exciter/receiver has three main functional units: an exciter 38, signal conditioner 40 and demodulation and detection circuit 42. The exciter 38 consists of an AC signal source 44, followed by a power driver 46 which provides a high current, high voltage excitation signal to an interrogator antenna coil 48 through a capacitor 50. The interrogator coil 48 and the capacitor 50 are selected to resonate at the excitation signal frequency, so that the voltage across the coil is much greater than the voltage output from the driver.

The signal conditioner 40 connects to the interrogator coil 48 and serves to amplify the response signal returned from the transponder, while filtering out the excitation signal frequency as well as other noise and undesired signals outside the frequency range of the transponder signals. It includes a bandpass filter/bandstop filter 51 that actively passes the response signal frequencies returned from the transponder and passively excludes the high energy at the excitation frequency, and an amplifier 52.

The amplified output of the signal conditioner 40 is fed to the demodulation and detection unit 42, which includes an FSK demodulator 54 and a microcomputer 56. The FSK demodulator 54 is a phase-locked loop circuit configured as a tone decoder which gives a digital output as the signal from the transponder shifts between two frequencies. The microcomputer 56 extracts the wheel rotation information plus any identification code from this digital output by observing the timing of transitions between the two logic levels. The information obtained by the microcomputer 56 can be transferred to a display or printer, sent over communication lines to a remote point, stored on tape, disk or other storage medium, or sent to another computer. The microcomputer 56, or another computer to which its output is connected, can store the past history of readings from the same vehicle (as determined by the transponder's identification code) and subtract out the vehicle's most recent previous driving distance reading from the current reading to compute the incremental distance driven since the last reading. It is helpful to occasionally compare the wheel odometer with the dashboard odometer and adjust the wheel odometer as necessary to maintain synchronism between the two.

Figure 3:
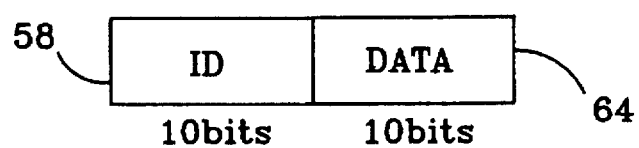
FIG. 3 is a map of a preferred overall memory organization for the transponder.

FIG. 3 shows an exemplary organization for memory 16' The first memory section 58, typically 10 bits, is non-reprogrammable and reserved for a conventional transponder identification code. The second memory section 64, typical 10 bits, is reprogrammable and holds the variable data representing the wheel's rotational history.

Figure 4:
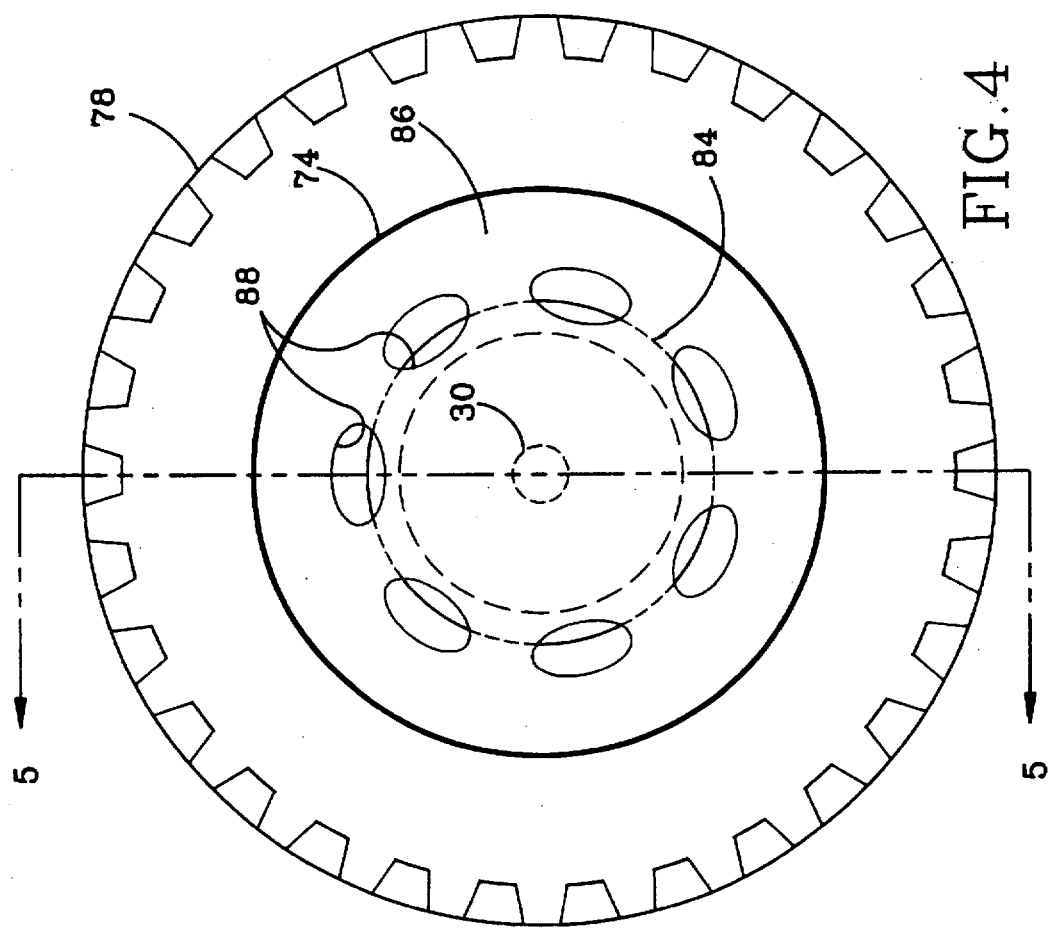
FIG. 4 is an elevation view of a tire mounted on a wheel that carries a transponder in accordance with the invention.
Figure 5:
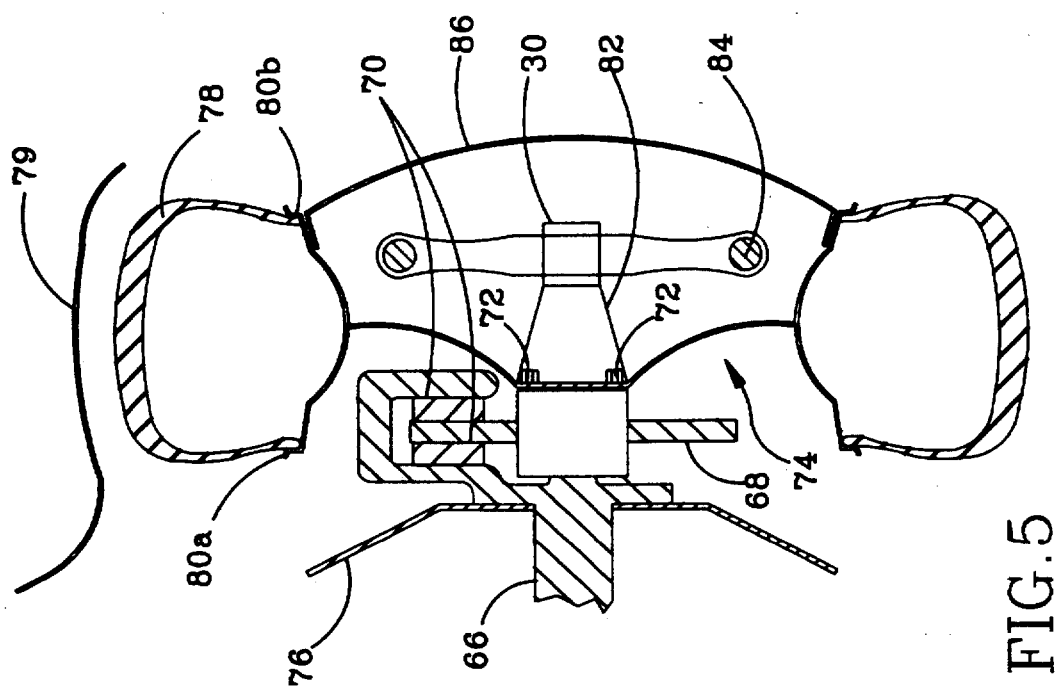
FIG. 5 is a sectional view taken along the section line 5—5 of FIG. 4.

FIGS. 4 and 5 illustrate a preferred mounting scheme for the transponder. A standard wheel assembly is shown, including a vehicle axle 66, a brake rotor 68 and calipers 70, and a set of wheel nuts 72 holding the wheel 74 onto the axle. A splash guard 76 is positioned on the vehicle side of the wheel assembly to protect the calipers and rotor from water and dirt. A tire 78 is mounted to the wheel between peripheral wheel rims 80a and 80b.

The odometer/shaft encoder combination 30 is preferably mounted to the axle 66, which functions as a wheel hub, by a mounting structure 82 that is fastened to the axle by the lugs 72 which also hold the wheel on. The transponder circuit chip, which is too small to be clearly shown in FIG. 5, is preferably mounted on or near the odometer/shaft encoder 30 to minimize the length of transmission lines.

The transponder antenna 2 is preferably implemented with a coil 84 that is held in place around the mounting structure 82 and, like the mounting structure, odometer/shaft encoder and transponder chip, rotates along with the wheel.

Newer hubcaps are formed from plastic materials that do not block RF transmissions. Even if an older metal hubcap is used, heat vent openings 88 are almost always provided. The diameter of the antenna coil 84 can be selected so that it is at least partially exposed behind the hubcap openings 88 (the transponder antenna's resonant frequency depends upon both the coil diameter and the number of turns; the number of turns can be adjusted to compensate for changes in coil diameter without changing the net resonant frequency). A perfect line-of-sight between the exciter/receiver and antenna coil is not necessary even with a metal hubcap, so long as a reasonable portion of the transponder signal can radiate out through the hubcap openings 88.

While particular embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system for communicating information on the distance traveled by a wheeled vehicle, comprising:

a wheel having a mounting structure for mounting the wheel on the wheeled vehicle, a sensor for sensing rotations of said wheel to provide a sensor signal that is indicative of the distance traveled by the wheeled vehicle to which the wheel is mounted, and a radio frequency (RF) transponder energized by an RF interrogation signal, wherein said transponder is connected to receive said sensor signal and to transmit a transponder signal to a remote location away from said wheeled vehicle, wherein said transponder signal corresponds to said sensor signal, and further wherein said sensor and said transponder are mounted to said wheel to rotate with said wheel while remaining substantially stationary relative to each other and to said wheel.

2. The system of claim 1, said wheel including a rotational hub, and said sensor comprising an odometer/shaft encoder combination that is mounted to and rotates with said hub.

3. The system of claim 1, said wheel including a rotational hub, and said transponder including an antenna coil that is mounted to and rotates with said hub.

4. The system of claim 1, said wheel including a hubcap having a plurality of openings, wherein said antenna coil is positioned between said wheel and said hubcap and is at least partially aligned with said openings.

5. The system of claim 1, wherein said transponder stores and transmits an identification code as part of said transponder signal.

6. The system of claim 1, wherein said transponder includes a memory that is connected to receive said sensor signal as a memory input, and a transponder circuit that is energized in response roan interrogation signal to transmit said transponder signal from the memory.

7. The transponder of claim 6, said memory comprising a digital memory that is at least partially reprogrammable, wherein said sensor is connected to program the reprogrammable portion of said memory with said sensor signal in a digital format, and said transponder circuit reads out said sensor signal from said memory for inclusion in said transponder signal.

8. The transponder of claim 7, wherein said memory includes a non-reprogrammable portion for storing a transponder identification code, and said transponder circuit reads out the transponder identification code stored in said non-reprogrammable portion along with said sensor signal for inclusion in said transponder signal.

9. A system for obtaining driving distance information from a wheeled vehicle, comprising:

a radio frequency (RF) exciter/receiver remotely positioned away from the wheeled vehicle for transmitting an RF interrogation signal, a sensor mounted to a wheel of the wheeled vehicle, said sensor sensing rotations of said wheel to provide a sensor signal that is indicative of the distance traveled by said vehicle, a radio frequency (RF) transponder mounted to and rotating with said wheel, said transponder energized by said RF interrogation signal, wherein said transponder is connected to receive said sensor signal and to transmit a transponder signal to a remote location away from said wheeled vehicle, wherein said transponder signal corresponds to said sensor signal and is detectable by said exciter/receiver when the exciter/receiver is in communication with the wheel.

10. The system of claim 9, said wheel including a rotational hub, and said sensor comprising an odometer/shaft encoder combination that is mounted to and rotates with said hub.

11. The system of claim 9, wherein said transponder stores and transmits an identification code as part of said transponder signal.

12. The system of claim 9, wherein said transponder includes a memory that is connected to receive said sensor signal as a memory input, and a transponder circuit that is energized in response to said RF interrogation signal to transmit said transponder signal from the memory.

13. A system for obtaining driving distance information from a wheeled vehicle, comprising:

a radio frequency (RF) exciter/receiver remotely positioned away from the wheeled vehicle for transmitting an RF interrogation signal, a sensor mounted to a wheel of the wheeled vehicle, said wheel having a rotational hub and said sensor sensing rotations of said wheel to provide a sensor signal that is indicative of the distance traveled by said vehicle, a radio frequency (RF) transponder including an antenna coil that is mounted to and rotates with said hub, said transponder energized by said RF interrogation signal, wherein said transponder is connected to receive said sensor signal and to transmit a transponder signal to a remote location away from said wheeled vehicle, wherein said transponder signal corresponds to said sensor signal and is detectable by said exciter/receiver when the exciter/receiver is in communication with the wheel.

14. A transponder system for communicating information concerning the number of rotations experienced by a rotating structure, comprising:

a sensor that includes a mounting mechanism for mounting the sensor to the rotating structure to rotate with the rotating structure, said sensor providing a sensor signal that is indicative of the rotations of the rotating structure to which it is mounted, and a radio frequency (RF) transponder including an antenna coil that is mountable to the rotating structure to which said sensor is mounted, said transponder energized by an RF interrogation signal, wherein said transponder is connected to receive said sensor signal, said transponder transmitting a transponder signal to a remote location away from said rotating structure, wherein said transponder signal corresponds to said sensor signal.

15. The system of claim 14, said sensor comprising an odometer/shaft encoder combination.

16. The system of claim 14, wherein said transponder stores and transmits an identification code as part of said transponder signal.

17. The system of claim 14, wherein said transponder includes a memory that is connected to receive said sensor signal as a memory input, and a transponder circuit that is energized in response to said RF interrogation signal to transmit said transponder signal from the memory.

18. A transponder system for communicating information concerning the rotation history of a rotating structure, comprising:

a sensor for sensing the rotations of the rotating structure and providing a sensor signal that is indicative of said rotations, a radio frequency (RF) transponder mounted to and rotating with said rotating structure, said transponder energized by an RF interrogation signal, wherein said transponder is connected to receive said sensor signal and transmit a transponder signal to a remote location away from said rotating structure, wherein said transponder signal corresponds to said sensor signal, said RF transponder including, an antenna for receiving said RF interrogation signal, a rectifier connected to said antenna to provide a power supply for said transponder in response to the received interrogation signal, a clock which provides a clock signal, a counter which counts up in response to said clock signal, a memory which is at least partially reprogrammable, a decoder connected to be clocked by said counter and in response to enable a readout from said memory, an output circuit which applies a readout from said memory to said antenna for transmission as said transponder signal, and an interconnection circuit interconnecting said sensor with said memory to program the reprogrammable portion of said memory with said sensor signal for inclusion in said transponder signal.

19. The transponder of claim 18, wherein said memory includes a non-reprogrammable portion for storing a transponder identification code, said decoder enabling a read-out of said identification code from said memory along with said sensor signal in response to clocking by said counter.

20. The transponder system of claim 18, further comprising a mounting structure for mounting said sensor to the rotating structure.

21. The transponder system of claim 20, said sensor comprising an odometer/shaft encoder combination.

* * * * *